United States Patent
Yao et al.

(10) Patent No.: US 10,422,396 B2
(45) Date of Patent: Sep. 24, 2019

(54) BRAKE SYSTEM AND METHOD OF CONTROL WITH AIR GAP ESTIMATION

(71) Applicant: Meritor Heavy Vehicle Braking Systems (UK) Limited, Cwmbran, Gwent (GB)

(72) Inventors: Yixin Yao, Ann Arbor, MI (US); Prashant Narula, Gwent (GB)

(73) Assignee: Meritor Heavy Vehicle Braking Systems (UK) Limited, Cwmbran Gwent (GB)

( * ) Notice: Subject to any disclaimer, the term of this patent is extended or adjusted under 35 U.S.C. 154(b) by 171 days.

(21) Appl. No.: 15/484,572

(22) Filed: Apr. 11, 2017

(65) Prior Publication Data

US 2017/0350462 A1 Dec. 7, 2017

(30) Foreign Application Priority Data

Jun. 3, 2016 (EP) .................................. 16172941

(51) Int. Cl.
| | |
|---|---|
| *F16D 65/66* | (2006.01) |
| *B60T 17/22* | (2006.01) |
| *F16D 66/02* | (2006.01) |
| *B60T 1/06* | (2006.01) |
| *B60T 13/74* | (2006.01) |
| *F16D 66/00* | (2006.01) |
| *F16D 65/38* | (2006.01) |

(52) U.S. Cl.
CPC .............. *F16D 65/66* (2013.01); *B60T 1/065* (2013.01); *B60T 13/741* (2013.01); *B60T 17/22* (2013.01); *F16D 66/00* (2013.01); *F16D 66/021* (2013.01); *F16D 2065/386* (2013.01); *F16D 2066/003* (2013.01)

(58) Field of Classification Search
CPC .......... F16D 65/66; F16D 66/00; B60T 17/22; B60T 1/065
USPC ............................................. 701/70; 188/71.8
See application file for complete search history.

(56) References Cited

U.S. PATENT DOCUMENTS

| | | |
|---|---|---|
| 5,285,190 A | 2/1994 | Humphreys et al. |
| 5,432,442 A | 7/1995 | Andersen |
| 6,293,370 B1 | 9/2001 | McCann et al. |

(Continued)

FOREIGN PATENT DOCUMENTS

| | | |
|---|---|---|
| DE | 19536695 A1 | 4/1997 |
| DE | 19730094 A1 | 1/1999 |

(Continued)

OTHER PUBLICATIONS

European Patent Office, Extended European Search Report for European Patent Application No. 15155613.1 dated Jan. 22, 2016.
European Patent Office, Extended European Search Report for the corresponding European Patent Application No. 16172941.3 dated Dec. 19, 2016.

*Primary Examiner* — Nadeem Odeh
(74) *Attorney, Agent, or Firm* — Brooks Kushman P.C.

(57) ABSTRACT

A brake system and a method of controlling a brake system. The method may include indirectly estimating an air gap between a brake friction member and a brake pad assembly based on a position signal from a position sensor that detects cycling of the friction brake and a further signal indicative of an amount of brake force used to engage the brake pad assembly with the brake friction member. The air gap may be adjusted when an estimated air gap differs from a desired air gap.

19 Claims, 5 Drawing Sheets

(56) References Cited

U.S. PATENT DOCUMENTS

| | | |
|---|---|---|
| 9,457,782 B2 | 10/2016 | Yao |
| 2007/0068237 A1 | 3/2007 | Zumberge |
| 2007/0235267 A1 | 10/2007 | Liebert |
| 2009/0057074 A1 | 3/2009 | Tsuruta et al. |
| 2010/0168979 A1 | 7/2010 | Baier-Welt et al. |
| 2014/0069750 A1 | 3/2014 | Nohira et al. |
| 2014/0345271 A1* | 11/2014 | Isono ................. B60T 13/66 60/533 |
| 2015/0260246 A1 | 9/2015 | Yao |
| 2015/0330470 A1* | 11/2015 | Siebke ............ F16D 55/2255 188/1.11 L |
| 2016/0123421 A1* | 5/2016 | Staahl ............ F16D 55/2255 188/1.11 L |

FOREIGN PATENT DOCUMENTS

| | | |
|---|---|---|
| DE | 10138452 A1 | 2/2003 |
| DE | 10228115 A1 | 1/2004 |
| DE | 102006029699 A1 | 1/2008 |
| EP | 0460376 A2 | 12/1991 |
| EP | 0995921 A2 | 4/2000 |
| EP | 2650556 A1 | 10/2013 |
| EP | 2955408 A1 | 12/2015 |
| EP | 2998607 A1 | 3/2016 |
| WO | 2009083216 A2 | 7/2009 |
| WO | 2010133463 A1 | 11/2010 |
| WO | 2013152998 A1 | 10/2013 |

\* cited by examiner

BRAKE SYSTEM AND METHOD OF CONTROL WITH AIR GAP ESTIMATION

TECHNICAL FIELD

This patent application relates to a brake system and method of control in which an air gap between a brake friction member and a brake pad assembly may be estimated.

BACKGROUND

An air gap detector is disclosed in U.S. Pat. No. 9,457,782.

SUMMARY

The present invention provides an improved air gap detector system.

According to an aspect of the present invention, there is provided a method of controlling a brake system that includes cycling a friction brake, indirectly estimating an air gap between a brake friction member and a brake pad assembly based on a position signal from a position sensor that detects cycling of the friction brake and a further signal indicative of an amount of brake force used to engage the brake pad assembly with the brake friction member; and adjusting the air gap when an estimated air gap differs from a desired air gap.

According to an aspect of the present invention there is provided a method of controlling a brake system that includes cycling a friction brake by actuating a brake pad assembly from a retracted position into engagement with a brake friction member and releasing the brake pad assembly such that the brake pad assembly disengages the brake friction member and moves toward the retracted position, indirectly estimating an air gap between the brake friction member and the brake pad assembly based on a position signal from a position sensor that is indicative of actuation of a brake pedal and on a further signal indicative of an amount of brake force used to engage the brake pad assembly with the brake friction member, and adjusting the air gap when an estimated air gap differs from a desired air gap.

According to an aspect of the present invention there is provided a brake system that includes a brake friction member, a brake pad assembly configured to move between a retracted position in which the brake pad assembly does not engage the brake friction member and an extended position in which the brake pad assembly engages the brake friction member, an actuator subsystem that includes an operating shaft that rotates when the brake pad assembly moves between the retracted position and the extended position, and a position sensor that detects rotation of the operating shaft, wherein an air gap between the brake pad assembly and the brake friction member is estimated based on a position signal from the position sensor and a signal indicative of an amount of brake force used to engage the brake pad assembly with the brake friction member.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
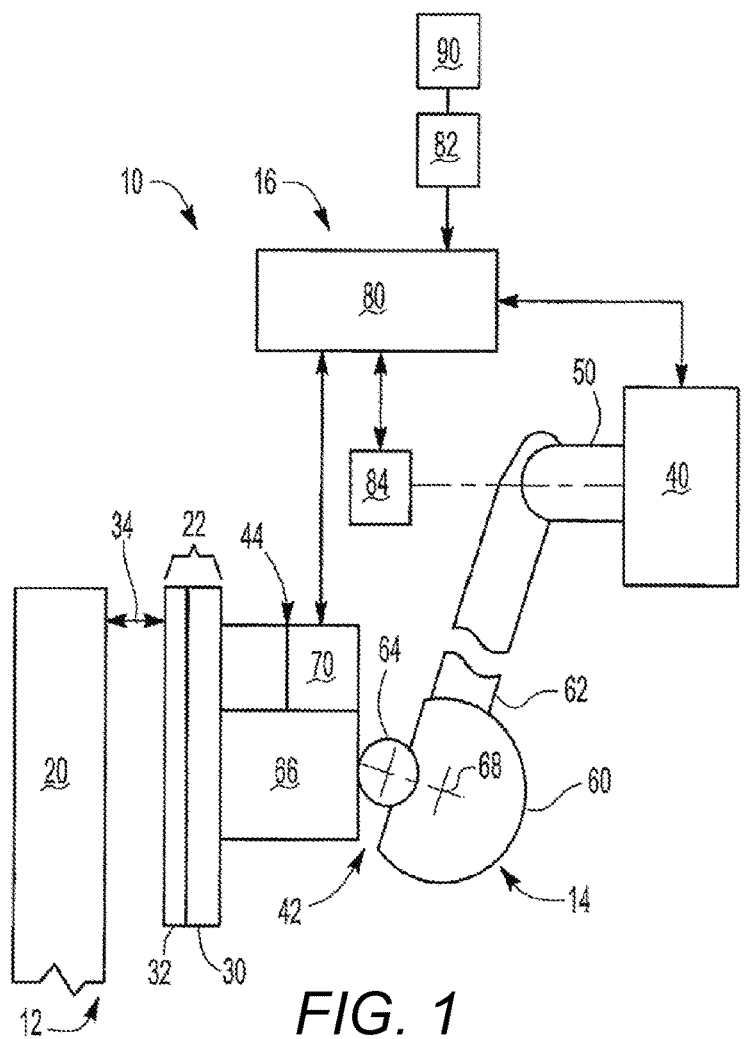
FIG. 1 is a simplified schematic of a brake system.

Referring to FIG. 1, an exemplary brake system 10 is shown. The brake system 10 may be provided with a vehicle, such as a motor vehicle like a truck, farm equipment, or military transport or weaponry vehicle. The vehicle may include a trailer for transporting cargo in one or more embodiments.

The brake system 10 may be configured to slow or inhibit rotation of at least one associated wheel assembly. The brake system 10 may include a set of friction brakes 12, an actuator subsystem 14, and a control system 16.

A friction brake 12, which may also be called a foundation brake, may be disposed proximate a wheel assembly and may be configured to slow rotation of the wheel assembly. Multiple friction brakes 12 may be provided with the vehicle and may be controlled by the control system 16. The friction brake 12 may have any suitable configuration. For example, a friction brake 12 may be configured as a disc brake. The friction brake 12 may include a brake friction member 20 and at least one brake pad assembly 22.

The brake friction member 20 may be connected to a wheel hub. As such, the brake friction member 20 may rotate with a wheel assembly and with respect to a brake pad assembly 22 when braking is not requested. In a disc brake configuration, the brake friction member 20 may be configured as a rotor, which is also known as a brake disc.

In a disc brake configuration, the brake friction member 20 may extend into an opening in a carrier (not shown). The carrier may be fixedly mounted to the vehicle and may receive and/or support inboard and outboard brake pad assemblies 22. As such, the carrier may straddle the brake friction member 20 and help position the brake pad assemblies 22 on opposite sides of the brake friction member 20.

The brake pad assembly 22 may engage the brake friction member 20 when braking is requested or commanded and exert frictional force against the brake friction member 20 to retard or slow rotation of an associated wheel assembly. In a disc brake configuration, inboard and outboard brake pad assemblies 22 may be disposed on opposite sides of the brake friction member 20 and may be configured to engage opposite sides of the brake friction member 20 to slow the rotation of a vehicle wheel. The brake pad assemblies 22 may be received in a caliper housing (not shown) that may be movably disposed on the carrier. More specifically, the caliper housing may be slidably disposed on a pair of slide pins that may be fixedly disposed on the carrier. The caliper housing may receive at least a portion of the actuator subsystem 14, which may actuate the brake pad assemblies 22 into engagement with the brake friction member 20. The actuator subsystem 14 may apply a brake force to the brake pad assemblies 22 so as to force them into engagement with the friction member thereby generating the above mentioned frictional force. For example, the actuator subsystem 14 may include one or more pistons that may actuate the inboard brake pad assembly 22 toward the brake friction member 20 and move the caliper housing to actuate the outboard brake pad assembly 22 toward the rotor as will be discussed in more detail below.

The brake pad assembly 22 may include a backing plate 30 and a friction material 32.

The backing plate 30 may be a structural member of a brake pad assembly 22. The backing plate 30 may be made of any suitable material, such as a metal or metal alloy.

The friction material 32, which may also be called a brake lining, may be disposed on the backing plate 30. The friction material 32 may face toward the brake friction member 20 and may engage the brake friction member 20 during vehicle braking. In addition, the friction material 32 may be spaced apart from and may not engage the brake friction member 20 when the friction brake 12 is not being applied. The clearance or distance between the friction material 32 and the brake friction member 20 when the friction brake 12 is not being applied may be referred to as an air gap 34 or running clearance. No clearance or zero clearance may be present between the friction material 32 and the brake friction member 20 when the friction brake 12 is applied.

The actuator subsystem 14 may be configured to actuate a brake pad assembly 22 between a retracted position and an extended position. The retracted position may also be referred to as an initial position or rest position. The brake pad assembly 22 may be spaced apart from the brake friction member 20 and may be stationary when in the retracted position. As such, a brake pad assembly 22 may be in the retracted position when the friction brake 12 is not being applied. The brake pad assembly 22 and more specifically the friction material 32 may engage the brake friction member 20 when in the extended position.

The actuator subsystem 14 may be disposed proximate or provided with the caliper housing. The actuator subsystem 14 may have any suitable configuration. For example, the actuator subsystem 14 may have a pneumatic, hydraulic, electrical, or electromechanical configuration, or combinations thereof as are known by those skilled in the art. In the simplified schematic shown in FIG. 1, the actuator subsystem 14 has a pneumatic configuration. In such a configuration, the actuator subsystem 14 may include an actuator 40, an actuation mechanism 42, and an air gap adjustment mechanism 44.

The actuator 40 may be configured to exert an input force that may be amplified and transmitted to form the output force which actuates a brake pad assembly 22 toward the brake friction member 20. Typically, the input force is amplified to form the output force. Since the geometry of the components which form the actuator subsystem 14 are known, then the amplification ratio is known. The amplification ratio may be constant, or alternatively the amplification ratio may vary depending upon the positions of the various components within the actuator subsystem 14. In either event a relationship exists between the input force and the output force.

The actuator 40 may have any suitable configuration. For example, the actuator 40 may be a linear actuator, such as a pneumatic air chamber or pneumatic cylinder in one or more embodiments. In at least one embodiment, the actuator 40 may include an actuator rod 50 that may move linearly between a first position (return position) and a second position (advanced position). The actuator 40 may be controlled by the control system 16 and may actuate a brake pad assembly 22 in response to a brake command as will be discussed in more detail below.

The actuation mechanism 42 may transmit the input force exerted by the actuator 40 as an output force to the brake pad assemblies 22. For example, the actuator mechanism 42 may include various mechanical components, such as linkages, shafts, bearings, rollers, springs, and one or more pistons that may cooperate to transmit force to actuate the brake pad assemblies 22 between the retracted and extended positions in a manner known by those skilled in the art. For illustration purposes, a simplified example of an actuation mechanism 42 is shown in FIG. 1 that includes an operating shaft 60, a linkage 62, a roller 64, and an actuator unit 66.

The actuator 40 may be operatively connected to an operating shaft 60. In FIG. 1, the actuator 40 is indirectly connected to the operating shaft 60 via the linkage 62, which may also be called an operating lever. The linkage 62 may be coupled to the actuator rod 50. As such, extending the actuator rod 50 may cause the operating shaft 60 to rotate about an axis 68 due to interaction with a roller 64. The roller 64 may transmit force to the brake pad assemblies 22 via the actuator unit 66, which may include more pistons in a manner known by those skilled in the art.

Movement of the actuator 40 from the first position to the second position may cause the actuator rod 50 to move left from the position shown in FIG. 1. Movement of the actuator rod 50 may transmit the input force to the operating shaft 60 via the linkage 62 and may cause the operating shaft 60 to rotate counterclockwise about the axis 68 and/or roller 64 from the perspective shown. The output force may then be transmitted to actuate a brake pad assembly 22 from the retracted position to the extended position by the actuator unit 66. In a floating caliper configuration, an inboard brake pad assembly 22 may engage the brake friction member 20 before and outboard brake pad assembly (not shown). A reaction force (which is substantially equal to the output force) may be transmitted to the outboard brake pad assembly to pull the outboard brake pad assembly against the brake friction member 20 via movement of the floating caliper housing when the inboard brake pad assembly 22 has engaged the brake friction member 20. As such, the inboard and outboard brake pad assemblies 22 may cooperate to engage and brake or inhibit rotation of the brake friction member 20. The actuation mechanism components may return to their initial positions, or starting positions when a brake command ends and the actuator 40 is permitted to move from the second position to the first position (e.g., the actuator rod 50 is permitted to back to its initial position). As such, the operating shaft 60 may rotate in a first direction when a brake pedal is actuated and may rotate in a second direction disposed opposite the first direction when the brake pedal is released.

The air gap adjustment mechanism 44 may be provided to adjust the air gap to compensate for friction material wear or air gap or clearance changes that may be due to temperature change or other factors. In at least one embodiment, the air gap adjustment mechanism 44 may include an adjustment motor 70. The adjustment motor 70 may have any suitable configuration. For example, the adjustment motor 70 may be an electric motor and may include an encoder that may be configured to measure displacement or rotation of a motor shaft to facilitate monitoring and control of the adjustment motor 70. The adjustment motor 70 may be connected to components that may establish or set the retracted position or rest position of a brake pad assembly 22. For example, the adjustment motor 70 may be operatively connected to a tappet that may be provided with or associated with the actuator unit 66. In at least one embodiment, the tappet may receive the piston of the actuator unit 66 and may have threads that interact with corresponding threads on the piston to permit or inhibit relative rotation to adjust the air gap in a manner known by those skilled the art. Operation of the adjustment motor 70 may be controlled by the control system 16.

The control system 16 may be configured to monitor and/or control operation of the brake system 10. The control system 16 may include one or more control modules or controllers 80 that may be provided to monitor and control various components. For simplicity, a single controller is shown in FIG. 1; however, it is contemplated that multiple control modules or controllers or a distributed control architecture may be provided. The controller 80 may monitor and control the actuator subsystem 14, air gap adjustment mechanism 44 and its adjustment motor 70, and the amount of brake torque provided by the friction brakes 12. In addition, the controller 80 may also process input signals or data from various input devices or sensors such as a brake pedal sensor 82 and an actuation mechanism position sensor 84.

A brake pedal sensor 82 may be provided to detect a braking command or a brake torque command that may be provided by a vehicle driver or vehicle operator. For example, the brake pedal sensor 82 may detect the position of a brake pedal 90 or the position or operating state of a component that may be connected to or operated by a brake pedal, such as a treadle valve that may modulate a control fluid pressure that may be provided to a relay valve that may control the supply of fluid to one or more friction brakes 12 or friction brake actuators. Alternatively, the brake pedal sensor 82 may be configured as a pressure sensor that may detect fluid pressure that may directly or indirectly control the actuator 40 or braking of the vehicle. The detected position of the brake pedal and/or detected pressure may be used to control the brake torque provided by the brake system 10. For example, depending on the configuration of the brake system 10 the controller 80 may control operation of a valve that controls fluid pressure provided to a friction brake 12, a brake pump that pressurizes fluid, and/or an electric motor that may actuate a brake pad assembly 22. The amount of brake torque provided by the brake system 10 may be proportional to a detected angle of motion or amount of actuation of the brake pedal 90 or other brake torque command input device.

The actuation mechanism position sensor 84, which is also referred to as a position sensor, may detect rotation of the operating shaft 60. As such, the actuation mechanism position sensor 84 may provide a signal or data that may be indicative of rotation of the operating shaft 60 about the axis 68. The actuation mechanism position sensor 84 may be of any suitable type. For example, the actuation mechanism position sensor 84 may be an encoder.

Figure 2:
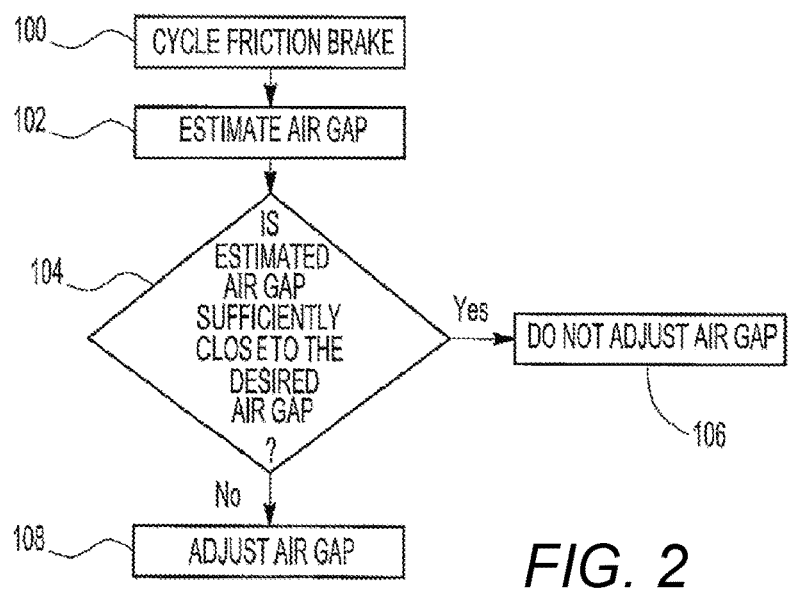
FIGS. 2 and 3 are flowcharts associated with a method of controlling a brake system.
Figure 3:
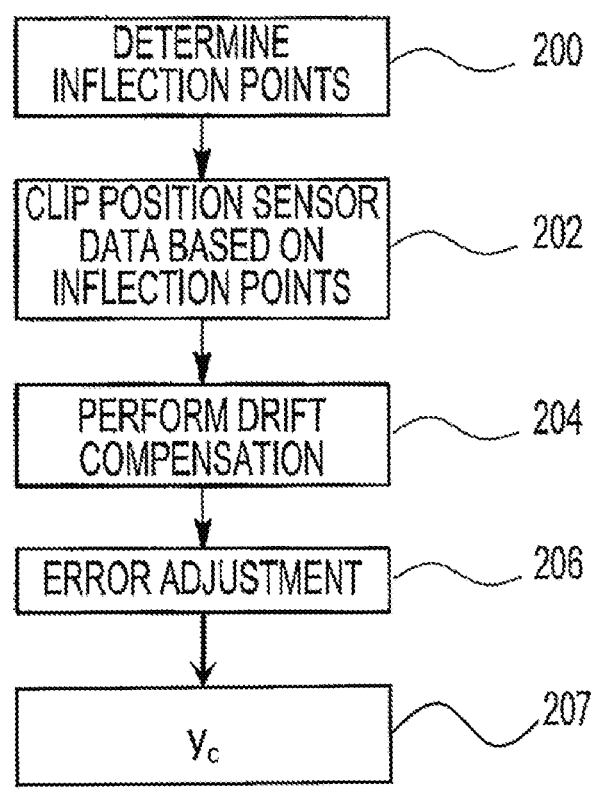

Referring to FIGS. 2 and 3, flowcharts illustrating a method of controlling the brake system 10 are shown. As will be appreciated by one of ordinary skill in the art, the flowchart may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. In at least one embodiment, a method may be executed by the controller 80 and may be implemented as a closed loop control system.

As an overview, the method may indirectly estimate the size or width of the air gap 34 between the brake friction member 20 and a brake pad assembly 22 and may control or adjust the air gap as appropriate. The width of the air gap 34 may not be directly detected by a sensor or other device that may directly measure the distance from the brake friction member 20 and a brake pad assembly 22 when the brake pad assembly 22 is in the retracted position. Indirect estimation of the air gap may be affected by various factors that may lead to inaccurate air gap estimates. For example, indirect estimation of the air gap may be affected by multiple factors associated with the characteristics of the actuator subsystem 14 (wear, component expansion, component contraction, tolerance variations, vibrations, noise, position sensor bias and drift, etc.), which may be further affected by environmental factors (e.g., temperature which may cause component expansion or contraction, contaminants, etc.). Moreover, noise and disturbance during air gap detection, nonlinearity of the position sensor signal, and time delay in air gap adjustment may also influence air gap estimates. The method discussed below may help provide more accurate air gap estimates and control of the air gap.

Referring to FIG. 2, a flowchart that overviews the method is shown.

Figure 4:
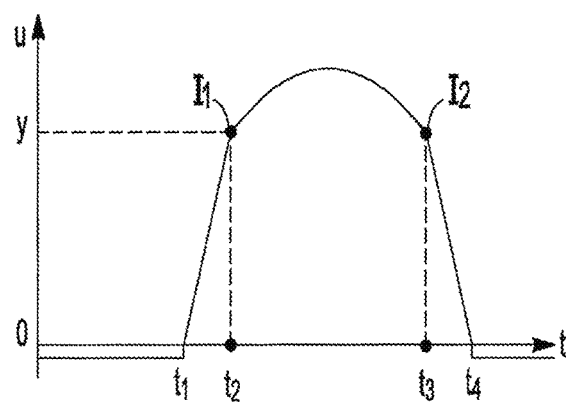
FIGS. 4-9 are exemplary plots that help illustrate method steps.

At block 100, the method may cycle the friction brake and obtain data or a signal from the actuation mechanism position sensor 84. The friction brake may be cycled when vehicle braking is desired or requested. A request for braking may be based on data or a signal from the brake pedal sensor 82. A request for braking may also be automatically initiated or automatically requested rather than manually requested. For example, braking of the vehicle may be automatically initiated by an adaptive cruise control system or pre-impact collision avoidance system. An adaptive cruise control system may automatically adjust vehicle speed in response to the proximity and/or relative speed of another vehicle. As such, an adaptive cruise control system may brake the vehicle to adjust proximity and/or vehicle speed. A pre-impact collision avoidance system may be configured to detect a potential collision or impact with the vehicle before it occurs and brake or slow the vehicle to avoid a collision. Cycling the friction brake may include actuating one or more brake pad assemblies 22 from the retracted position to the extended position (i.e., into engagement with the brake friction member 20) and releasing the brake pad assembly 22 such that the brake pad assembly 22 disengages the brake friction member 20 and moves back to or toward the retracted position. The actuation mechanism position sensor 84 may detect rotation of the operating shaft 60 during cycling of the friction brake 12. As such, a signal or data from the actuation mechanism position sensor 84 may detect movement or the absence of movement of a brake pad assembly 22. An example of an exemplary signal from the actuation mechanism position sensor 84 is shown in FIG. 4 and will be discussed in more detail below with the flowchart in FIG. 3.

At block 102, the air gap (i.e., air gap size or width) may be estimated. The size or width of the air gap 34 may be estimated based on the signal or data from the actuation mechanism position sensor 84 and from the output force generated. The estimated size or width of the air gap 34 may be referred to as the estimated air gap.

At block 104, the estimated air gap is compared to a desired air gap, which may also be referred to as a threshold air gap. The estimated air gap may be based on the signal from the actuation mechanism position sensor 84 and from the output force generated as previously discussed. The desired air gap may be a predetermined value and may be based on the configuration of the brake system and/or vehicle development testing. The desired air gap may be indicative of an air gap width or distance beyond which the brake pad assembly 22 and its friction material 32 is not sufficiently close to the brake friction member 20 when in the retracted position. In addition, the desired air gap may be indicative of an air gap width or distance at which the brake pad assembly 22 and its friction material 32 is too close to the brake friction member 20 when in the retracted position. The desired air gap may be expressed as a single value but may incorporate a tolerance range. For example, the desired air gap may be expressed as a value like 0.6 mm, but may have a tolerance of +/−0.05 mm, which thereby expresses the desired air gap as a range from 0.55 mm to 0.65 mm. Thus, the desired air gap may be a range rather than a single absolute value. If the estimated air gap is sufficiently close to the desired air gap, then the method may continue at block 106. If the estimated air gap is not sufficiently close to the desired air gap, then the method may continue at block 108.

At block 106, the air gap may not be adjusted. The air gap may not be adjusted since the estimated air gap indicates that the friction material 32 of at least one brake pad assembly 22 is sufficiently close to the brake friction member 20 when in the retracted position to provide a desired braking performance. Likewise, the air gap may not be adjusted when the estimated air gap indicates that the friction material 32 of at least one brake pad assembly 22 is sufficiently distant or not too close to the brake friction member 20 when in the retracted position. As such, the retracted position may not be adjusted.

At block 108, the air gap may be adjusted. For example, the air gap may be reduced by operating the air gap adjustment mechanism 44 to move one or more brake pad assemblies 22 closer to the brake friction member 20 when the estimated air gap is greater than the desired air gap. As such, the retracted position of a brake pad assembly 22 may be changed such that the brake pad assembly 22 is moved closer to the brake friction member 20 than the previous retracted position or before making the air gap adjustment. Similarly, the air gap may be increased by operating the air gap adjustment mechanism 44 to move one or more brake pad assemblies 22 further from the brake friction member 20 when the estimated air gap is less than the desired air gap. As such, the retracted position of a brake pad assembly 22 may be changed such that the brake pad assembly 22 is moved further from the brake friction member 20 than the previous retracted position or before making the air gap adjustment. In at least one embodiment, the air gap adjustment may be initiated or may occur during release of the brake pad assembly 22, or while the brake pad assembly 22 is moving from the extended position toward the retracted position. The air gap 34 may be adjusted by operating the adjustment motor 70 to actuate the air gap adjustment mechanism 44 and set the retracted position closer to the brake friction member 20. The amount of adjustment may be based on the difference between the estimated air gap and the desired air gap. The magnitude of the difference may then be used to determine a number of adjustment motor revolutions or length of time to activate the adjustment motor 70 to reduce the air gap to a desired amount or distance. For example, the distance or amount of brake pad movement per revolution of the adjustment motor 70 may be calculated or may be a predetermined amount that in turn may be used to determine how long to activate the adjustment motor 70 or how many motor shaft revolutions may be sufficient to reduce the air gap.

Figure 5:
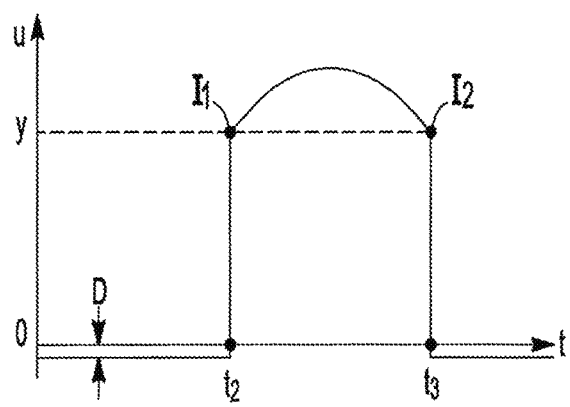
Figure 6:
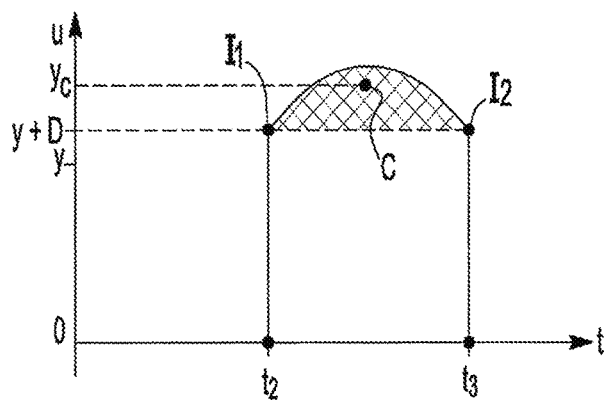
Figure 7:
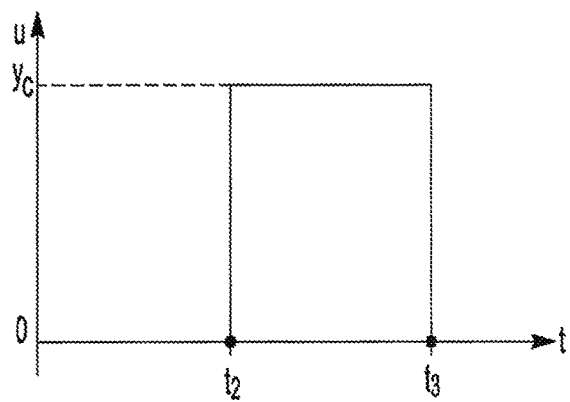

Referring to FIG. 3, a flowchart is shown that provides more detail regarding estimation of the air gap. The flowchart in FIG. 3 is best understood with reference to FIGS. 4-7. In FIGS. 4-7, the rotational position of the operating shaft 60 detected by the actuation mechanism position sensor 84 is plotted on the vertical axis. The vertical axis may be depicted in any suitable units that may represent angular motion, such as degrees. In FIGS. 4-7, units of measurement employed by the actuation mechanism position sensor 84 (e.g., encoder units) are used to represent a generic unit of measure and are referenced by the letter U. Time (t) is measured along the horizontal axis. FIGS. 5-7 show the signal from the position sensor during and after processing.

Referring to FIG. 4, a signal from the actuation mechanism position sensor 84 before processing. From time 0 to time 1, the operating shaft may not rotate. Thus, the actuation mechanism position sensor 84 may not detect rotation of the operating shaft during this time period. As such, the signal may be expected to extend along the time axis (i.e., the actuation mechanism position sensor 84 may be expected to have a reading of zero); however, the signal is shown with a negative signal drift from the time axis (i.e., the entire signal is offset downward or negatively from the expected position) which may result from one or more of the factors previously discussed. Cycling of the friction brake is shown between time 1 ($t_1$) and time 4 ($t_4$). The signal may increase from time 1 ($t_1$) to time 2 ($t_2$) at a first slope or with a first curvature, which may be indicative of actuation of one or more brake pad assemblies toward the brake friction member. From time 2 ($t_2$) to time 3 ($t_3$), the brake pad assembly may be in engagement with the brake friction member such that there is no air gap. As such, it would be expected that the signal would not change (i.e., the signal would be horizontal and constant); however, the signal is shown with a second slope or second curvature which may result from signal error and/or one or more of the mechanical and/or environmental factors previously discussed. The signal may decrease from time 3 ($t_3$) to time 4 ($t_4$) at a third slope or with a third curvature, which may be indicative of disengagement of one or more brake pad assemblies toward the brake friction member. After time 4 ($t_4$), the actuation mechanism position sensor 84 does not detect rotation of the operating shaft.

At block 200, the method determines inflection points associated with the signal. The inflection points may be determined by interpolation or any suitable signal processing technique. A first inflection point $I_1$ is located at time 2 ($t_2$). The first inflection point $I_1$ may be indicative of engagement of the brake pad assembly with the brake friction member. A second inflection point $I_2$ is located at time 3 ($t_3$). The second inflection point $I_2$ may be indicative of release of the brake pad assemblies or disengagement of the brake pad assemblies from the brake friction member. The first inflection point $I_1$ may or may not have the same magnitude as the second inflection point $I_2$.

At block 202, the position sensor signal may be clipped. Clipping the signal from a position sensor may be based on the first and second inflection points. More specifically, the signal may be clipped to the time value that corresponds with the first inflection point $I_1$ and may be clipped to the time value that corresponds with the second inflection point $I_2$. This is best shown in FIG. 5. In FIG. 5, the signal is clipped such that the signal is a vertical line at time 2 ($t_2$) from the horizontal line (originally shown from time 0 to time 1) to the first inflection point $I_1$. Similarly, the signal is clipped such that the signal is a vertical line at time 3 ($t_3$) from the second inflection point $I_2$ to the horizontal line.

At block 204, the method may perform drift compensation. Drift compensation may occur after clipping the signal at block 202. Drift compensation may compensate or correct for the drift or non-zero signal that would otherwise be expected when the friction brake is not actuated or cycled. Drift compensation is best understood by comparing FIG. 5 to FIG. 6. In FIG. 6, the entire clipped signal in FIG. 5 is adjusted such that the encoder measurement is set to zero when the friction brake is not actuated. As such, the entire position sensor signal may be adjusted upward (when there is negative signal drift) or downward (if there is positive signal drift) so that the signal is set to zero before the first inflection point $I_1$ and/or after the second inflection point $I_2$. The amount of signal drift shown in FIG. 5 is designated D. Drift compensation may be based on a drift measurement. Drift measurement may be based on an actual or physical measurement. For example, drift compensation may be based on drift measurement data from an absolute position sensor that may directly detecting or measure the width of the air gap. Alternatively, drift compensation may be based on an estimated drift measurement provided by a model-based system in which brake pressure and or brake temperature may be used to model or determine an estimated drift amount.

At block 206, error adjustment may occur. Error adjustment may adjust the signal to a constant value between the first inflection point $I_1$ and the second inflection point $I_2$. Such adjustments may be based on a reasoning process that may employ fuzzy logic. Error adjustment is best shown by comparing FIGS. 5 and 6. In FIG. 5, the shaded area is the error area. The error area may represent a signal region where a stable constant (horizontal) signal is expected and may be bounded by the signal located between the first inflection point $I_1$ and the second inflection point $I_2$, or a straight line that may extend from $I_1$ to $I_2$. A centroid or geometrical center of the error area may be determined in any suitable manner, such as by integration of the signal curve between and above $I_1$ and $I_2$ in the example shown in FIG. 5. The centroid may be similar to a "center of mass" of the error area. The centroid may include a time axis coordinate and an encoder axis coordinate. In FIG. 5, the centroid is represented by the letter C and has an encoder axis (vertical axis) coordinate of $y_c$. Encoder axis centroid and more particularly the encoder axis coordinate may be used to level the signal. In FIG. 7, the signal is adjusted such that the signal is set to a constant value that corresponds to $y_c$ between time 2 ($t_2$) and time 3 ($t_3$) (e.g., between $I_1$ and $I_2$). After time 3 ($t_3$) coordinate $y_c$ may be stored e.g., at block 207 or maintained until the next brake action.

Figure 8:
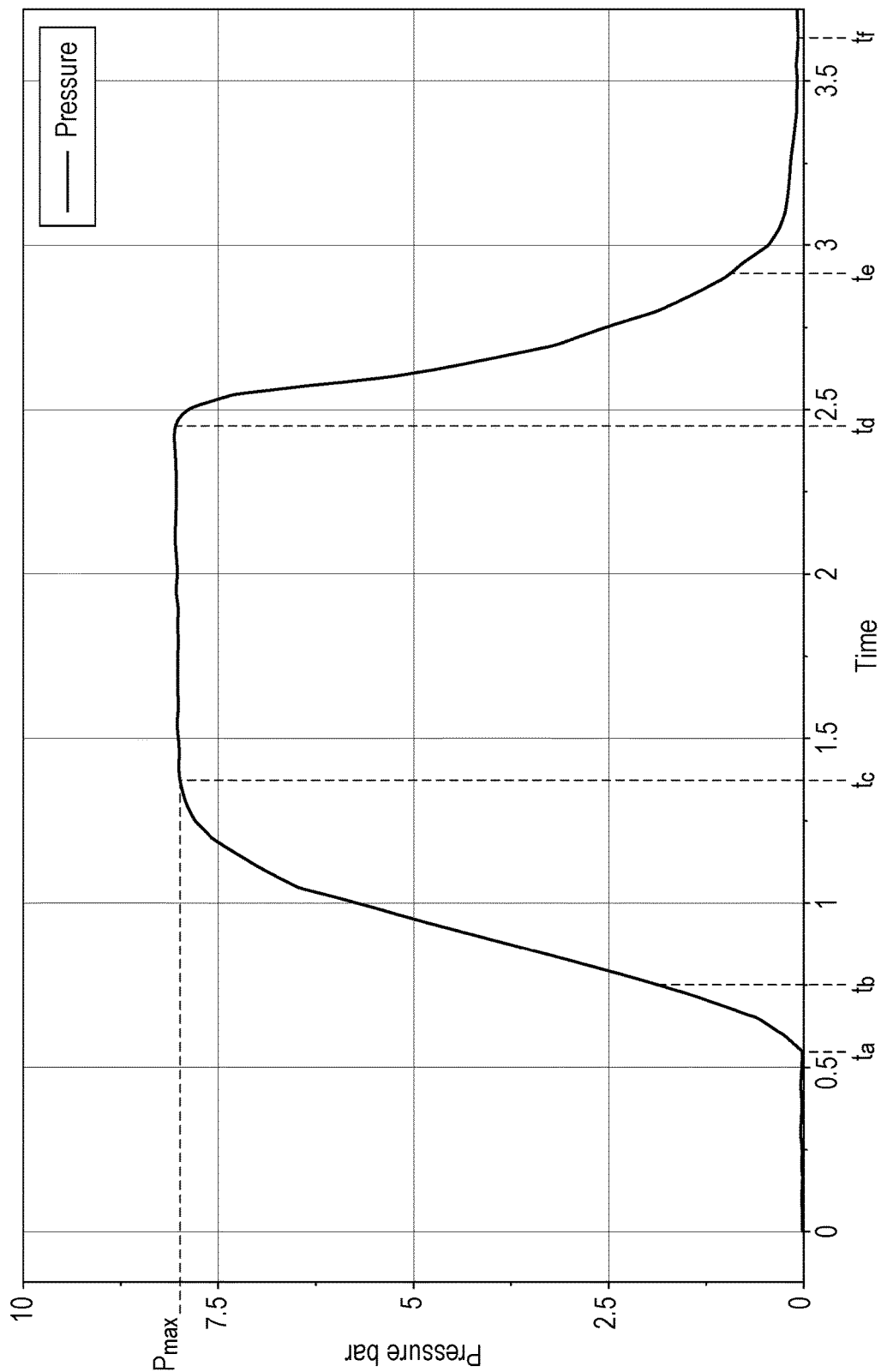

With reference to FIG. 8 the pressure of fluid in the actuator 40 has been plotted against time in respect of a brake cycle. In this embodiment the pressure in actuator 40 can be sensed by the brake pedal sensor 82 which has been configured as a pressure sensor (as described above) to detect the pressure of fluid in the actuator 40. From time zero to $t_a$, there is no pressure in the actuator and hence the brake does not generate any braking torque since the brake pad assembly 22 is spaced from the brake friction member 20. Between times $t_a$ and $t_c$ the pressure in the actuator 40 progressively increases to a maximum $P_{max}$ (in this case 8 bar) Between time $t_a$ and $t_c$ the brake pad assembly 22 moves into engagement with the brake friction member 20 and applies an output force to brake friction member 20 thereby creating a brake torque. At some time between $t_a$ and $t_c$ the brake pad assembly engages the friction member, and in this example this occurs at $t_b$. The relationship between the pressure in the actuator and the output force generated by the brake system is known and thus the pressure in the actuator 40 is indicative of an amount of output force generated by the actuator subsystem 14.

The pressure in the actuator 40 remains at 8 bar until time $t_d$ when the fluid (typically air) is vented from the actuator and the pressure decays to zero at time $t_f$ wherein the brake pad assembly 22 has returned to the position shown in FIG. 1, i.e., an air gap 34 exists between the brake pad assembly 22 and the brake friction member 20. At some time between time $t_d$ and $t_f$ the brake pad assembly 22 will disengage from the brake friction member 20, and in this example this is at time $t_e$. Thus, between $t_e$ and $t_f$ the gap between the brake pad assembly 22 and the brake friction member 20 is progressively increasing.

Figure 9:
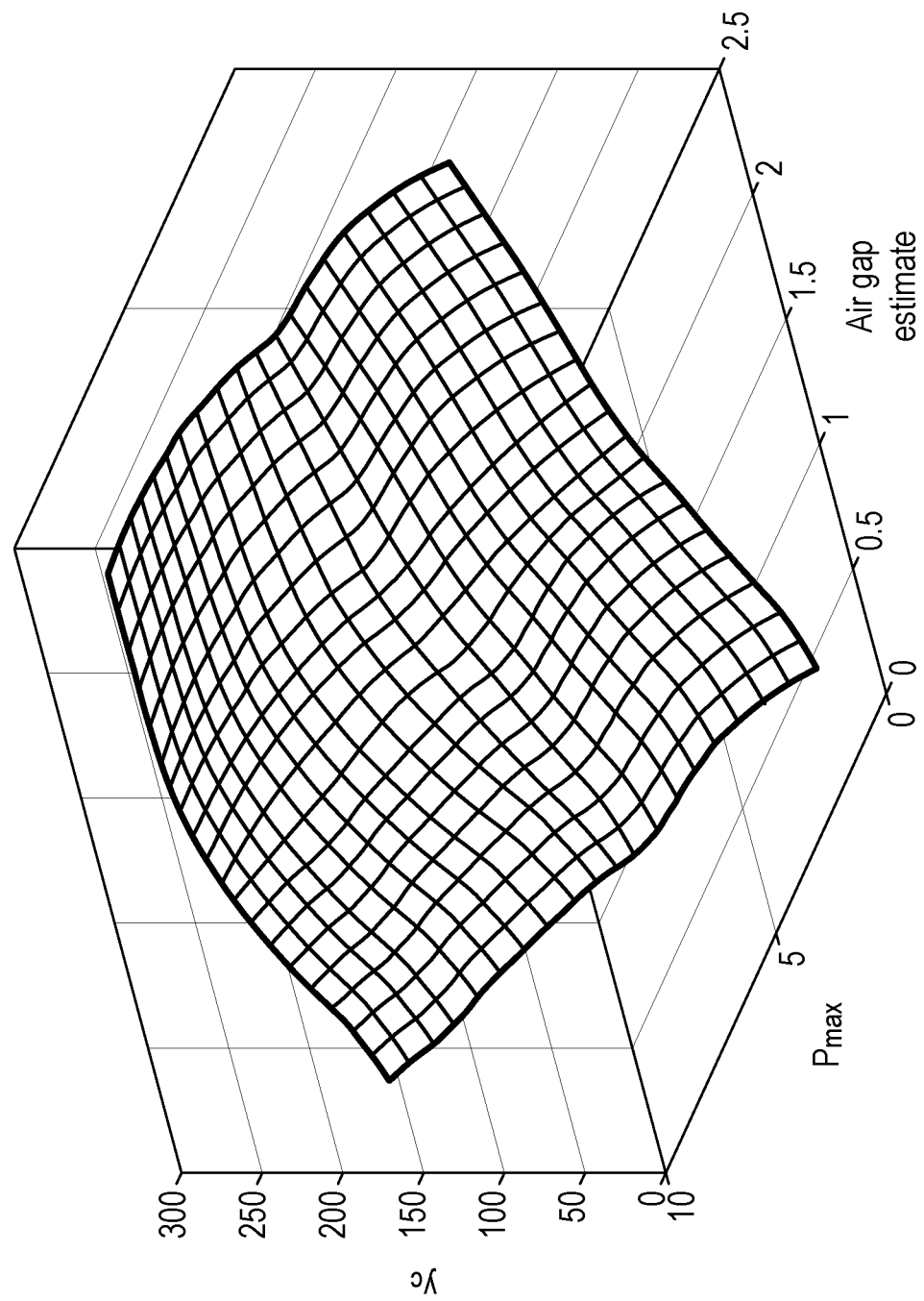

FIG. 9 shows a three dimensional contour map of relationship between $y_c$, $P_{max}$ and the air gap. This relationship is based on the particular configuration of the brake system 10 and its particular components and the relationship can be determined during the design and development of the particular brake system. For a particular brake system there is a predefined relationship between $y_c$, $P_{max}$ and the air gap. This relationship can be defined via map or contour as shown in FIG. 9, and/or via a look up table, and/or via an algorithm and/or via a database.

Thus, knowing $y_c$ and knowing $P_{max}$ then the air gap estimate can be determined from FIG. 9. Hence, the estimate air gap in block 102 of FIG. 2 is determined from FIG. 9. A method described from thereon in FIG. 2 can be used to either adjust the air gap if adjustment is necessary or not to adjust the air gap if no adjustment is necessary.

As described above, there is a relationship between $y_c$, $P_{max}$ and the air gap. As described above, $P_{max}$ is indicative of an amount of output force generated by the actuator subsystem 14 during the braking cycle. Thus, a relationship exists between the position of a component of the friction brake, the amount of output force generated during a braking cycle, and the air gap. As mentioned above, the pressure in the actuator 40 is indicative of an amount of output force generated but other parameters of the brake system are indicative of an amount of output force generated. Thus, the force applied to a brake pedal is indicative of an amount of output force generated, the amount of bending in the linkage 62 is indicative of an amount of output force generated, the compression in actuator rod 50 is indicative of an amount of output force generated as are other measurable parameters.

As will be appreciated, the above mentioned output force is a brake force used to engage the brake pad assembly with the brake friction member. However, there are many other brake forces generated within the system that are brake forces used to engage the brake pad assembly with the brake friction member. For example, the input force exerted by the actuator 40 is a brake force that is used to engage the brake pad assembly with the brake friction member and the pressure in the actuator is a signal indicative of the amount of input force. As a further example, the force applied to the brake pedal is a brake force that is used to engage the brake pad assembly with the brake friction member and the force applied by a brake pedal can be measured by a sensor. As a further example, when the brake is applied, the brake force causes the linkage 62 to bend and the brake force causing the linkage 62 to bend can be measured by a sensor. As a further example, the compression in actuator rod 50 is a brake force used to engage the brake pad assembly with the brake friction member and the brake force causing compression of actuator rod 50 can be measured by a sensor. The present invention is applicable to any brake force used to engage the brake pad assembly with a brake friction member. The present invention is applicable to any type of further signal which is indicative of an amount of any type of brake force used to engage the brake pad assembly with a brake friction member.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a brake system comprising:
cycling a friction brake;
indirectly estimating an air gap between a brake friction member and a brake pad assembly based on a position signal from a position sensor that detects the cycling of the friction brake and a further signal indicative of an amount of brake three used to engage the brake pad assembly with the brake friction member, wherein indirectly estimating the air gap includes adjusting the position signal to compensate for drift of the position signal based on the further signal, wherein the further signal is indicative of a pressure in an actuator during the cycling of the friction brake; and
adjusting the air gap when the indirectly estimated air gap differs from a desired air gap.

2. The method of claim 1 wherein the position sensor detects rotation of an operating shaft during the cycling of the friction brake.

3. The method of claim 1 wherein cycling the friction brake further comprises actuating the brake pad assembly from a retracted position in which the brake pad assembly is spaced apart from the brake friction member into engagement with the brake friction member and releasing the brake pad assembly such that the brake pad assembly disengages the brake friction member.

4. The method of claim 3 wherein adjusting the air gap further comprises operating an adjustment motor to change the retracted position such that the brake pad assembly is disposed closer to the brake friction member, or wherein the method further comprises adjusting the air gap when the indirectly estimated air gap is less than the desired air gap by operating the adjustment motor to change the retracted position such that the brake pad assembly is disposed further from the brake friction member, or wherein adjusting the air gap occurs during release of the brake pad assembly.

5. The method of claim 1 further comprising not adjusting the air gap when the indirectly estimated air gap is within an allowable range to the desired air gap.

6. The method of claim 1 wherein the further signal is indicative of a maximum pressure in the actuator during the cycling of the friction brake.

7. The method of claim 1 wherein the step of indirectly estimating the air gap includes determining a predetermined relationship between the position signal, the further signal, and the air gap and determining the estimate of the air gap from the position signal, the further signal, and the predetermined relationship.

8. The method of claim 7 wherein the predetermined relationship is defined by at least one of a map, a look up table, an algorithm and a database.

9. A method of controlling a brake system comprising:
cycling a friction brake by actuating a brake pad assembly from a retracted position into engagement with a brake friction member and releasing the brake pad assembly such that the brake pad assembly disengages the brake friction member and moves toward the retracted position;
indirectly estimating an air gap between the brake friction member and the brake pad assembly based on a position signal from a position sensor that is indicative of actuation of a brake pedal and on a further signal indicative of an amount of brake force used to engage the brake pad assembly with the brake friction member, wherein indirectly estimating the air gap includes adjusting the position signal to compensate for drift of the position signal based on the further signal, wherein the further signal is indicative of a pressure in an actuator during the cycling of the friction brake; and
adjusting the air gap when the indirectly estimated air gap differs from a desired air gap.

10. The method of claim 9 wherein indirectly estimating the air gap includes clipping the position signal from the position sensor by determining a first inflection point and a second inflection point of the position signal and clipping the position signal to a first time value that corresponds to the first inflection point and to a second time value that corresponds to the second inflection point.

11. The method of claim 10 wherein the first inflection point is indicative of engagement of the brake pad assembly with the brake friction member or wherein the second inflection point is indicative of disengagement of the brake pad assembly from the brake friction member.

12. The method of claim 10 wherein adjusting the position signal to compensate for the drift occurs after clipping the position signal.

13. The method of claim 12 wherein indirectly estimating the air gap further comprises making an error adjustment by determining a centroid of an error area disposed between the first inflection point and the second inflection point and adjusting the position signal based on the centroid of the error area.

14. The method of claim 13 wherein making the error adjustment includes adjusting the position signal to a constant value between the first inflection point and the second inflection point.

15. The method of claim 13 wherein making the error adjustment is based on fuzzy logic.

16. The method of claim 9 wherein the further signal is indicative of a maximum pressure in the actuator during the cycling of the friction brake.

17. A brake system comprising:
a brake friction member;
a brake pad assembly configured to move between a retracted position in Which the brake pad assembly does not engage the brake friction member and an extended position in which the brake pad assembly engages the brake friction member;

an actuator subsystem that includes an operating shaft that rotates when the brake pad assembly moves between the retracted position and the extended position;

a position sensor that detects rotation of the operating shaft; and a controller configured to estimate an air gap between the brake pad assembly and the brake friction member based on a position signal from the position sensor and a signal indicative of an amount of brake force used to engage the brake pad assembly with the brake friction member, wherein estimating the air gap includes adjusting, by the controller, the position signal to compensate for drift of the position signal based on a pressure in the actuator subsystem during cycling of the brake pad assembly.

18. The brake system of claim 17 wherein the position signal from the position sensor is obtained when the brake pad assembly moves from the retracted position to the extended position and back to the retracted position.

19. The brake system of claim 17 wherein the brake system further comprises an adjustment motor, wherein the adjustment motor moves the brake pad assembly closer to the brake friction member to reduce the air gap when the air gap estimated by the controller exceeds a desired air gap, or the adjustment motor moves the brake pad assembly further from the brake friction member to increase the air gap when the air gap estimated by the controller that is based on the position signal from the position sensor does not exceed the desired air gap, or wherein the adjustment motor adjusts the air gap when the brake pad assembly moves from the extended position toward the retracted position and the adjustment motor does not move the brake pad assembly from the retracted position to the extended position.

* * * * *